United States Patent
Adamczyk et al.

(10) Patent No.: US 10,790,661 B2
(45) Date of Patent: Sep. 29, 2020

(54) RIPPLE CONTROL AND OPTIMISATION IN A POWER TRANSMISSION NETWORK

(71) Applicant: GENERAL ELECTRIC TECHNOLOGY GMBH, Baden (CH)

(72) Inventors: Andrzej Adamczyk, Stafford (GB); Rosemary King, Stafford (GB); Antonios Tzimas, Stafford (GB)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 16/485,712

(22) PCT Filed: Jan. 31, 2018

(86) PCT No.: PCT/EP2018/052401
§ 371 (c)(1),
(2) Date: Aug. 13, 2019

(87) PCT Pub. No.: WO2018/149645
PCT Pub. Date: Aug. 23, 2018

(65) Prior Publication Data
US 2020/0059095 A1  Feb. 20, 2020

(51) Int. Cl.
*H02J 3/01* (2006.01)
*H02J 3/36* (2006.01)
(Continued)

(52) U.S. Cl.
CPC ........ *H02J 3/01* (2013.01); *H02J 3/18* (2013.01); *H02J 3/36* (2013.01); *H02M 1/15* (2013.01);
(Continued)

(58) Field of Classification Search
CPC ........ H02J 3/01; H02J 3/12; H02J 3/16; H02J 3/18; H02J 3/36; H02J 13/0006;
(Continued)

(56) References Cited

U.S. PATENT DOCUMENTS

| 4,419,660 A | * | 12/1983 | Bergdahl | ................ | H02M 1/14 333/17.1 |
| 6,359,423 B1 | | 3/2002 | Noro | | |

FOREIGN PATENT DOCUMENTS

| EP | 1130734 A2 * | 9/2001 | ................ H02J 3/01 |
| EP | 1130734 A2 | 9/2001 | |
| GB | 2437116 A | 10/2007 | |

OTHER PUBLICATIONS

International Search Report and the Written Opinion of PCT/EP2018/052401 dated Apr. 5, 2018.
(Continued)

*Primary Examiner* — Jue Zhang
(74) *Attorney, Agent, or Firm* — Eversheds Sutherland (US) LLP

(57) ABSTRACT

There is disclosed a controller (112) for a power electronic network element (110) of a power transmission network (100), wherein the controller (112) is configured to vary a control parameter of the network element (110) which at least partly determines a ripple profile in a transmission line of the network. The controller (112) is configured to vary the control parameter between at least a first value and second value to cause the ripple profile in the transmission line to change; and the controller is configured to vary the control parameter periodically or in response to a signal indicating a threshold temperature at a hotspot location along the transmission line. A method of optimising control parameters for a power transmission network (100) is also disclosed.

14 Claims, 6 Drawing Sheets

(51) Int. Cl.
  *H02M 1/15* (2006.01)
  *H04B 3/54* (2006.01)
  *H02J 3/18* (2006.01)
(52) U.S. Cl.
  CPC ............... *H04B 3/54* (2013.01); *Y02E 40/40* (2013.01); *Y02E 60/60* (2013.01)
(58) Field of Classification Search
  CPC . H02M 1/15; H04B 3/54; Y02E 40/40; Y02E 60/60
  See application file for complete search history.

(56) References Cited

OTHER PUBLICATIONS

European Search Report for Application No. 17156079.0 dated Jul. 17, 2017.

\* cited by examiner

RIPPLE CONTROL AND OPTIMISATION IN A POWER TRANSMISSION NETWORK

CROSS-REFERENCE TO RELATED APPLICATIONS

This application is a U.S. National Stage Application under 35 U.S.C. 371 and claims the priority benefit of International Application No. PCT/EP2018/052401 filed Jan. 31, 2018 which claims priority to EP17156079.0, filed Feb. 14, 2017, which are incorporated herein by reference.

The invention relates to a method of optimising control parameters for a power transmission network, in particular, to mitigate thermal and/or electric stress due to ripple in a transmission line of the network. The invention also relates to a corresponding method of controlling a power transmission network, an associated controller and network.

Power transmission networks, particularly High Voltage Direct Current (HVDC) networks, include power electronic network elements such as converters and current flow controllers for controlling power transmission through the network.

Such network elements control the power transmission in the network using power electronic (i.e. solid state) switches. The switching behaviour of such network elements may result in a standing-wave signal along the power transmission lines of the network which is referred to as ripple (i.e. current ripple and/or voltage ripple).

Recent developments in power electronic network elements (e.g. converters and current flow controllers) have served to reduce ripple effects. For example, converters such as line-commutated converters (LCC), diode bridge rectifiers, 2-level voltage source converters (VSC) and DC-DC converters may lead to a relatively strong ripple profile, whereas more recent modular multilevel converters (MMC VSCs) can be operated to significantly reduce ripple.

According to a first aspect there is provided a controller for a power electronic network element of a power transmission network, wherein the controller is configured to vary a control parameter of the network element which at least partly determines a ripple profile in a transmission line of the network, wherein the controller is configured to vary the control parameter between at least a first value and second value to cause the ripple profile in the transmission line to change; and wherein the controller is configured to vary the control parameter periodically and/or in response to a signal indicating a threshold temperature at a hotspot location along the transmission line.

For example, the controller may be configured to vary the control parameter every 2 hours. Periodic variation of the control parameter may be according to a predetermined schedule.

The control parameter may be selected from the group consisting of: a switching frequency of the power electronic network element; and an apparent impedance parameter which determines the apparent impedance of the network element.

For example, the apparent impedance parameter may relate to a control mode of a converter. Varying the apparent impedance parameter may include varying parameters of a plurality of network elements, for example two network elements at opposite ends of a transmission line. For example, in order to maintain a demand profile of power transmission (i.e. current and voltage properties along the transmission line) whilst varying an apparent impedance at one or more network elements, such as converters or current flow controllers, control parameters of two or more network elements may be varied, such as the control mode of a converter.

A network element may comprise a converter, and the apparent impedance at a terminal between a transmission line and the network element may be a function of a control mode of the converter. For example, the converter may be selectively operable in either a voltage control mode or a power control mode.

In the voltage control mode, the converter may be configured to regulate the DC voltage of the converter (e.g. a voltage source converter). In the power control mode, the converter may be configured to regulate power flow via the converter (e.g. a voltage source converter).

According to a second aspect there is provided a power transmission network comprising a power transmission line, a power electronic network element for controlling power transmission through the power transmission line, and a controller in accordance with the first aspect for varying a control parameter of the network element.

The power transmission network may further comprise: a temperature sensing apparatus configured to monitor a temperature profile along the transmission line. There may be a hotspot detection unit configured to determine when a local temperature maximum along the transmission line reaches a threshold based on an output of the temperature sensing apparatus. The controller may be configured to vary the control parameter of the network element based on the threshold amount of local heating being determined.

Additionally or alternatively, there may be a hotspot simulation unit configured to predict hotspots in the power transmission network and generate a signal indicating a threshold temperature at a hotspot location along the transmission line.

There may be a plurality of power electronic network elements interconnected by a plurality of transmission lines. The controller may be configured to vary control parameters of at least two of the network elements to change between respective configurations of the network. Each configuration may correspond to a different configuration of control parameters for the network element or network to result in a respective ripple profile.

The controller may comprise a centrally located (or global) controller governing the control parameters at a plurality of network elements. Alternatively, the controller may comprise discrete controllers at each of the plurality of network elements to be controlled, which may be interconnected for communication.

The power transmission network may be a High Voltage Direct Current (HVDC) network. The power transmission may be an AC network, such as a power transmission network for a plurality of wind turbines, and there may be at least one power electronic network element comprising an AC-DC converter for a respective wind turbine. The converter may be an AC-DC-AC converter for transferring power from the wind turbine into the AC network.

According to a third aspect of the invention there is provided a method of controlling a network element of a power transmission network, the method comprising varying a control parameter of the network element which at least partly determines a ripple profile in a transmission line of the network, wherein the control parameter is varied between at least a first value and a second value to cause the ripple profile in the transmission line to change; and wherein the control parameter is varied periodically or in response to a signal indicating a threshold temperature at a hotspot location along the transmission line.

The method may comprise conducting any of the operations of the controller described above with respect to the first and second aspects.

According to a fourth aspect of the invention there is provided a machine readable medium encoded with instructions executable by a processor, wherein the instructions are defined to carry out a method of controlling a network element of a power transmission device in accordance with the third aspect.

According to a fifth aspect, there is provided a computer-implemented method of optimising control parameters for a power transmission network comprising a transmission line and a power electronic network element for controlling power transmission through the transmission line, the method comprising:

defining a plurality of candidate configurations of the network, each candidate configuration defined by one or more variable control parameters for the network element, each control parameter at least partly determining a ripple profile in the transmission line;

for each candidate solution, simulating power transmission in the network to determine ripple data relating to a simulated ripple profile in the network;

selecting one of the candidate configurations of the network based on an objective function relating to thermal and/or electric stress due to ripple in the transmission line.

The candidate configurations may be defined so that each of the respective simulated ripple profiles have a ripple frequency of less than 10 kHz.

The candidate configurations may be defined, or the selected candidate configuration may be selected, so that conductor heating (i.e. resistive heating) owing to ripple in the transmission line is greater than dielectric heating. Conductor heating may dominate dielectric heating, for example it may be at least 3, or at least 5, or at least 10 times greater than dielectric heating.

Each control parameter at least partly determining the ripple profile in the transmission line means that the ripple profile is influenced by, or a function of, the or each control parameter.

The candidate configurations of the network may be defined so that each configuration corresponds to a different ripple profile (simulated or real) in the network.

The candidate configurations may be defined so that at least one control parameter varies between any two configurations. In other words, the candidate configurations may be defined so that any two configurations have differing values of at least one control parameter.

The objective function may be defined to mitigate hotspots of thermal and/or electric stress due to ripple in the transmission line.

The control parameters of at least two candidate configurations may be defined so that the respective simulated ripple profiles have different ripple frequencies. The control parameters defining the candidate configurations may include a switching frequency of the network element. The switching frequency may be varied between at least two of the candidate configurations so that the respective simulated ripple profiles have different frequencies.

The control parameters defining the candidate configurations may include an apparent impedance parameter relating to the apparent impedance at a terminal of the network. The apparent impedance parameter may be varied between at least two of the candidate configurations so that the respective simulated ripple profiles differ from one another.

For example, the apparent impedance parameter may correspond to the apparent impedance of a terminal between the transmission and the network element. There may be a plurality of network elements and/or a plurality of transmission lines, and the apparent impedance parameter may correspond to the apparent impedance at a terminal between any of the transmission lines and any of the network elements. There may be a corresponding plurality of apparent impedance parameters.

The selected candidate configuration may be selected at least partly based on an objective function relating to thermal and/or electric stress due to ripple in a target portion of the transmission line. The target portion of the transmission line may have an extent along the transmission line which is less than the extent of the entire transmission line. In other words, it may be a sub-portion of the transmission line. The target portion may correspond to a portion of irregular thermal conditions or constraints along the transmission line.

The objective function relating to thermal and/or electric stress due to ripple in the target portion of the transmission line may be defined based on an upper local limit of ripple magnitude at the target portion. Ripple magnitude may correspond to current ripple or voltage ripple.

The selected candidate configuration may be selected at least partly based on an objective function relating to the proximity of the target portion along the transmission line to a local maximum and/or minimum of ripple magnitude in a respective ripple profile. For example, proximity may be determined based on a separation between the target portion and a local minimum and a separation between the target portion and a local maximum. For example, the objective function maybe defined to select for (i.e. to produce a favourable outcome for) candidate configurations having ripple profiles in which the target portion is relatively closer to a local minimum than a local maximum of ripple magnitude.

A plurality of target portions of the transmission line may be defined. The or each objective function may be weighted so that it relates to thermal and/or electric stress due to ripple at each of the target portions. There may be a plurality of objective functions for the target portions (i.e. in a multi-objective optimisation), each objective function relating to one or more of the target portions. There may be further objective functions relating to global conditions along the transmission line.

For example, the objective function may be defined so that an optimal candidate configuration corresponds to alignment of the target function and a local minimum of ripple magnitude.

The or each target portion may correspond to one of: a junction between two portions of the transmission line; a tunnel portion of the transmission line; a region of adverse ground conditions for the transmission line; and an exposed portion of the transmission line in which the transmission line is exposed to atmospheric conditions.

Portions of the transmission line may be simulated as sub-surface portions, unless otherwise defined. Junctions between two portions of the transmission line may be particularly susceptible to adverse effects from hotspots of thermal or electric stress. It may be desirable to reduce hotspots of thermal or electric stress at a tunnel portion of the transmission line (i.e. a portion which passes through a tunnel for services and/or personnel) because transmission lines and other services may typically be co-located in a tunnel. Accordingly, hotspots of thermal stress in the cable may adversely affect other services, and there may be additional heating to the transmission line in the tunnel from co-located services. A region of adverse ground conditions for the transmission line may correspond to a region of poor ground thermal conductivity and/or a region of adverse ground composition, such as a region of rock as opposed to soil. An exposed region of the transmission line may be susceptible to heating by sunlight falling on the transmission line, such that it may be desirable to mitigate further heating due to ripple.

An objective function may relate to a global metric of thermal and/or electric stress due to ripple in the transmission line. For example, the global metric may be an average ripple magnitude, or a peak ripple magnitude.

The method may further comprise defining a transient control procedure for the network including sequentially and repeatedly changing between each of a plurality of selected candidate configurations to mitigate hotspots of thermal or electric stress at respective local maxima of ripple magnitude.

Each candidate configuration may correspond to a simulated ripple profile having one or more hotspot locations of local maximum ripple magnitude corresponding to a hotspot of thermal or electric stress. Each candidate configuration of the plurality of selected candidate configurations (i.e. those candidate configurations selected based on the or each objective function) may be selected so that at least some of the hotspot locations (corresponding to local maxima of ripple magnitude) differ between the respective simulated ripple profiles. Accordingly, in use, hotspots may be mitigated against by switching configurations of the network to change or move hotspot locations, such that each hotspot location is subjected to corresponding elevated thermal and/or electric stress only intermittently.

For example, a first selected candidate configuration may result in a first hotspot location. A second selected candidate configuration may be selected to complement (i.e. at least partly based on) the first selected candidate configuration so that, in the second candidate configuration, the first hotspot location is not aligned with a local maximum of ripple magnitude. For example, the second candidate configuration may be selected so that the first hotspot location is aligned with or proximal to a local minimum of ripple magnitude.

According to a sixth aspect there is provided a non-transitory machine-readable medium comprising instructions executable by a processor, wherein the instructions are defined to carry out a method of optimising control parameters for a power transmission network in accordance with the fifth aspect.

Preferred embodiments of the invention will now be described, by way of non-limiting examples only, with reference to the accompanying drawings, in which:

FIG. 1 schematically shows an example power transmission network;

FIG. 2 schematically shows portions of a power transmission line of the network;

FIG. 3 schematically shows a multi-terminal power transmission network;

Figure 1:
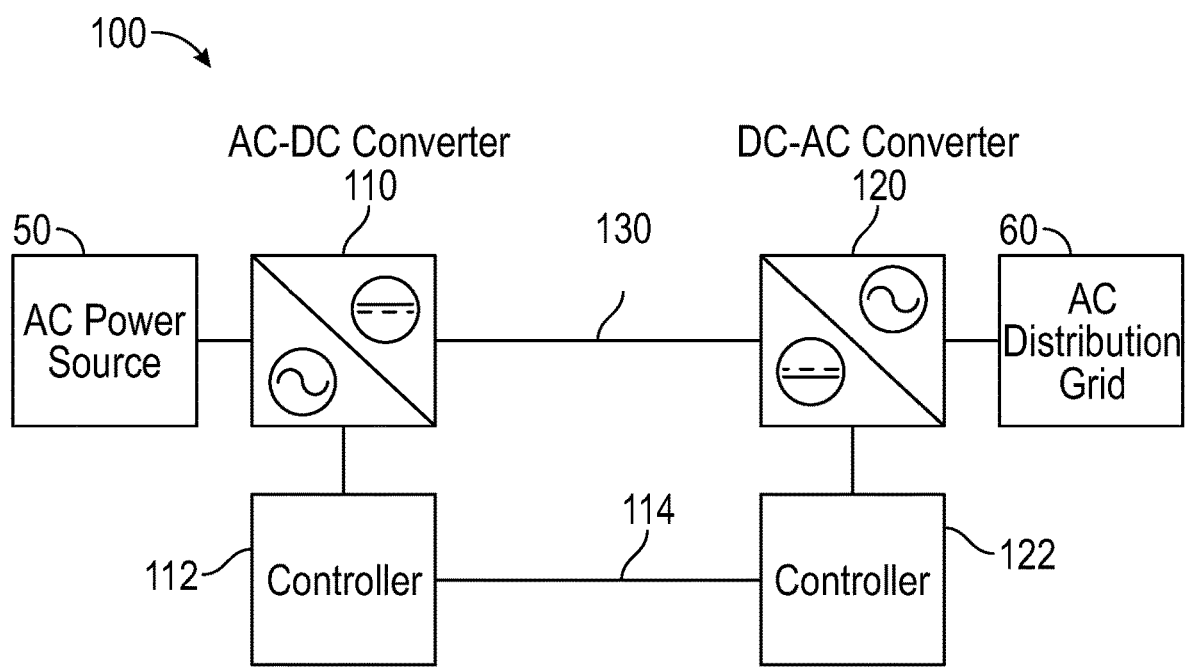

FIG. 1 shows an example power transmission network 100 for HVDC power transmission. The network 100 comprises an AC-DC converter 110, in particular a modular multi-level voltage source converter (MMC VSC), coupled to an AC power source 50; a DC-AC converter 120 (also a MMC VSC) coupled to an AC distribution grid 60, and a transmission line 130 extending therebetween for HVDC power transmission.

Each converter 110, 120 is provided with a respective controller 112, 122, the two controllers being in mutual communication by a control line 114. In other examples, the two controllers may be independent, or coupled to a global controller for the network 100 (not shown).

The controllers 110, 120 are configured to set control parameters for the respective converters. In this example, each controller 110, 120 is configured to set switching frequency control parameter relating to the frequency at which switching connections between sub-modules of the respective converter are made. For example, the switching frequency may be set in a range between 100 Hz and 5 kHz.

A control procedure for setting the switching frequency, or other control parameter, using a controller 110, 120 will be described in detail below.

Figure 2:
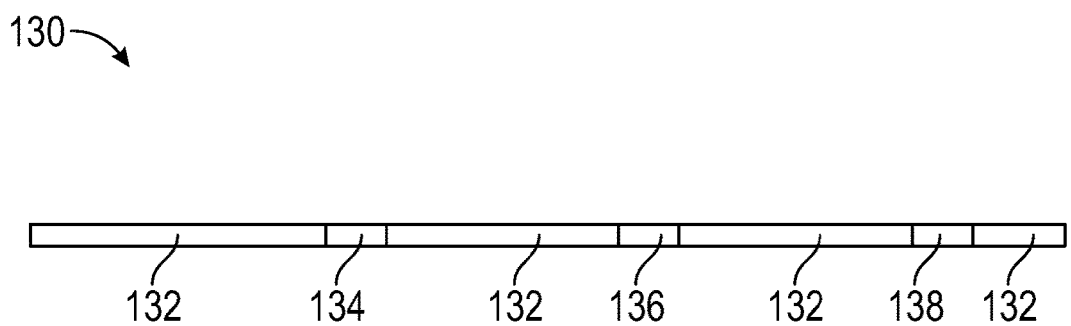

FIG. 2 shows sections of the example transmission line 130 which extends between the converters 110,120. In this example, the transmission line 130 is a 100 km line for HVDC transmission and is predominantly located below ground. As schematically shown in FIG. 2, in this particular example the transmission line 130 has four underground portions 132 separated by intervening portions 134, 136, 138 corresponding to irregular conditions along the transmission line 130. The conditions may be irregular to the extent that they are not uniform with the conditions experienced along the majority of the line or in the underground portions 132.

In series order for from the AC-DC converter 110 to the DC-AC converter 120, the intervening portions of the transmission line 130 include a tunnel portion 134, a junction portion 136 between connected sections of the transmission line 130 and an exposed portion 138 of the transmission line.

The tunnel portion 134 corresponds to the transmission line passing through a tunnel. It may be desirable to avoid hotspots of thermal and/or electric stress in portions of the transmission line within a tunnel, as there may be secondary sources of heat within the tunnel which could affect the line, such as co-located services in the tunnel. Further, a hotspot in the transmission line may have adverse effects on other co-located services within the tunnel. In this particular example, the tunnel portion is 4 km long.

The junction portion 136 corresponds to a junction between two sections of the transmission line (i.e. a join). It may be desirable to avoid hotspots of thermal and/or electric stress in junction portions to maintain the integrity of the junction. In this example, the junction portion is approximately 1 m (metre)long.

The exposed portion 138 corresponds to a portion of the transmission line 130 which is located above ground or otherwise exposed (such as in an open trench) so that it is exposed to atmospheric conditions. Exposed portions of a transmission line may experience heating from sunlight. Accordingly, it may be desirable to avoid hotspots of thermal and/or electric stress due to ripple in such exposed to avoid a cumulative together with heating from sunlight. In this example, the exposed portion 138 extends over approximately 200 m of the transmission line.

In other examples, there may be other such portions exposed to irregular conditions, such as a portion of the line corresponding to a region of adverse ground conditions, in particular regions with poor thermal conductivity away from the transmission line. For example, a region of rock may have poorer thermal conductivity than a region of soil.

Figure 3:
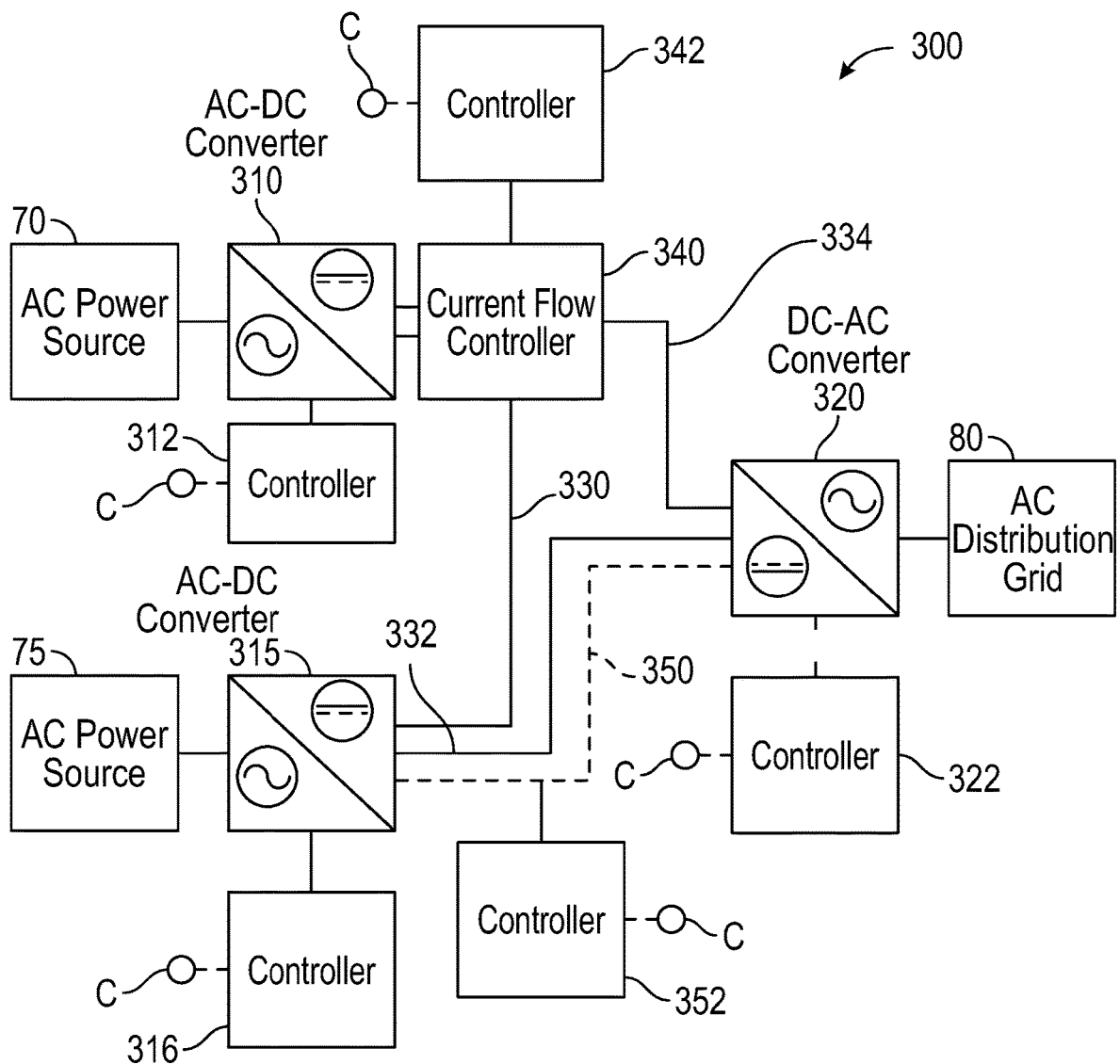

FIG. 3 shows a second example HVDC power transmission network 300.

The example network 300 comprises first and second AC-DC converters 310, 315 coupled to respective AC power sources 70, 75; and a DC-AC converter 320 coupled to an AC distribution grid 80. A series of transmission lines extend between the converters 310, 315, 320 in a circular arrangement such that the first and second AC-DC converters 310, 315 are coupled by a first transmission line 330; the second AC-DC converter 315 and the DC-AC converter 320 are coupled by a second transmission line 332; and the DC-AC converter 320 and first AC-DC converter are coupled by a third transmission line 334.

In this particular example, each of the transmission lines 330, 332, 334 is approximately 500 km in length.

A current flow controller (CFC) 340 is provided between the DC-AC converter 320 and the first AC-DC converter 310 for controlling current flow in the network 300 (i.e. in the circular arrangement of transmission lines 330, 332, 334). The CFC 340 may be provided anywhere along a transmission line, but in this particular example is co-located with the first AC-DC converter 310 and coupled to the first AC-DC converter 310 via feeder lines for the first and third transmission lines 330, 334.

The CFC 340 is configured to provide a variable voltage source or variable voltage drop in the network 300, so as to control current through the network. The CFC is a power electronic device which is configured to provide the variable voltage source of voltage drop by operating a plurality of solid-state (i.e. power electronic) switches at a switching frequency. An example CFC 340 is described in EP 2670013 B1.

Each of the converters 310, 315, 320 and the CFC 340 (i.e. each network element) is provided with a respective controller 312, 316, 322, 342 for controlling control parameters of the respective network element. In this particular example, each controller 312, 316, 322, 342 is configured to control both a switching frequency control parameter and an apparent impedance parameter relating to the apparent impedance of the network element.

In this example, the apparent impedance parameter relates to the control mode of the converters 310, 315, 322. In particular, each of the controllers 312, 316, 322 for the converters 310, 315, 320 are each configured to vary the control mode of the respective converter in order to vary the apparent impedance at the respective terminal between a transmission line and the converter. Each converter is selectively operable in a voltage control mode or a power control model. In the voltage control mode, the converter is configured to regulate the DC voltage of the converter. In a power control mode, the converter may be configured to regulate power flow via the converter.

In the voltage control mode, a controller for the converter may receive or determine operating set points for DC voltage and DC power from an upstream control layer (e.g. network control). These set points correspond to the DC voltage and DC power that the converter should produce at respective DC terminals of the converter.

In the power control mode, a controller for the converter may receive or determine operating set points for DC power and a measured DC power signal. The controller may determine an error between the set point and measured power which can be provided to a proportional-integral (PI) controller, for example. The PI controller may modulate a DC voltage reference of the converter to achieve the DC power set point. The voltage reference for a converter corresponds to a notional voltage waveform that provides the desired power transmission characteristics for the converter. For example, the voltage reference may be a time varying waveform with a frequency component related to the frequency of an associated AC system and a DC offset related to the DC voltage. The DC offset of the voltage reference waveform may define the output DC voltage and thereby influence the DC output current and power.

In this example, the apparent impedance of the converter depends on the control mode. In particular, with a converter operating in voltage control mode, the apparent impedance at a terminal between a transmission line and the converter may be relatively low (approaching that of a short circuit), whereas in the power control mode, the apparent impedance at the terminal may be relatively high (approaching that of an open circuit). A combination of power control mode and voltage control mode may be used (for example, different modes at different network elements, or by controlling a duty cycle of each mode for a respective network element) to achieve further variation of apparent impedance. Accordingly, since apparent impedance affects reflectance properties at terminals of a transmission line, a ripple profile along the transmission line may be varied in dependence on control modes for the respective network elements.

For example, in the circuit of FIG. 1, when converter 110 is operated in voltage control mode at the ripple frequency (i.e. switching at the ripple frequency) and converter 120 is operated in power control mode at the ripple frequency, one end of the transmission line has a relatively high apparent impedance (approaching that of an open circuit), whilst the other has a relatively low apparent impedance (approaching that of a short circuit). This may lead to ripple resonance at a quarter wavelength. In contrast, if both converters 110, 120 are in voltage control mode, the ripple resonance may be at a half wavelength.

In yet further examples, the apparent impedance may be varied by the selective connection of an auxiliary component at a respective terminal between the transmission line and a network element. For example, a capacitor or filter may be selectively coupled to the network to vary the apparent impedance. A corresponding apparent impedance parameter may therefore relate to the connection status of such an auxiliary component.

As shown in FIG. 3, each controller 312, 316, 322, 342 is provided with a connection to a global control network C for sending instructions to and between the controllers 312, 316, 322, 342. For clarity, the connections of the global control network C between the controllers are not shown in FIG. 3, and only the connection point to the control network is shown.

The network 300 further comprises a temperature sensing apparatus 350 for sensing temperatures along a transmission line of the network. In this particular example, the temperature sensing apparatus 350 is only provided along the second transmission line 332, but it will be appreciated that in other examples a temperature sensing apparatus may be provided to monitor temperatures along a plurality or all of the transmission lines of a network.

In this example, the temperature sensing apparatus a distributed temperatures sensing (DTS) system comprising an optical fibre extending along the transmission line 332. Heat transfer between the transmission line 332 and the optical fibre causes changes in the optical properties of the fibre. In use, an optical signal is sent through the fibre, and a reflected signal is generated, the properties of which depend on the optical properties of the fibre. A controller 352 of the temperature sensing apparatus 350 comprises a hotspot detection unit which is configured to analyse the reflected signal and determine thermal properties along the transmission line. In this particular example, the hotspot detection unit is configured to determine a temperature profile along the length of the transmission line, so that it may determine hotspots. In other examples, a temperature sensing apparatus may be provided which monitors limited portions of the line, such as target portions where it may be desirable to avoid hotspots of thermal and/or electrical stress in the transmission line.

Figure 4:
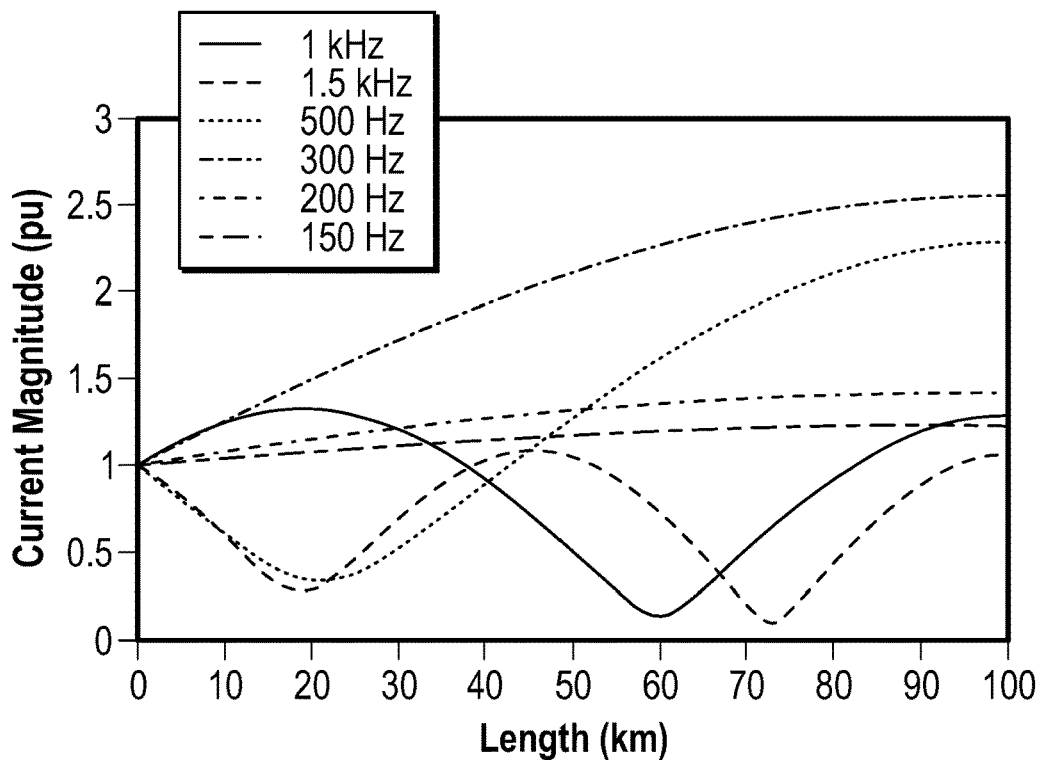
FIG. 4 shows ripple profiles in a 100 km power transmission line in different candidate configurations of the network.

The applicant has undertaken analysis of ripple profiles in the transmission lines of networks 100, 300 in order to support control and optimisation aspects of the invention as will be described in detail below. FIG. 4 shows ripple profiles in the 100 km transmission line 130 of the network 100 described above with respect to FIG. 1. In this particular example, the ripple profile is a profile of current ripple as measured in dimensionless units with respect to a baseline transmission current from the AC-DC converter 110.

FIG. 4 shows six ripple profiles corresponding to different configurations of the network 100, as determined by simulating power transmission in a model of the network 100 by a computer-implemented method. As such, the ripple profiles are simulated ripple profiles which correspond to a predicted ripple profile in the physical the network 100.

In this particular example, the ripple magnitude (i.e. the amplitude of the current ripple) is relatively low as compared with the baseline current, as the power electronic converters 110, 120 in the network 100 are MMC VSCs which are relatively effective in mitigating ripple. The per-unit (pu) dimensionless measure in FIG. 4 is therefore 1 percent, such that a ripple magnitude of 1 in FIG. 4 corresponds to 1% of the baseline DC current in the transmission line 130 at the AC-DC converter 110. In other networks, for example networks using different power electronics network elements such as LCCs, the ripple magnitude may be generally higher, for example up to 5 to 10% of a baseline current (in the absence of any filtering components in the network to reduce ripple magnitude).

Each configuration of the network 100 corresponds to a different ripple frequency varying from 150 Hz to 1 kHz. In this example, the ripple frequency is varied by changing the switching frequency control parameter (i.e. the switching frequency) of the AC-DC converter 110. The switching frequency of the corresponding DC-AC converter 120 may be varied accordingly (for example, by being set to the same switching frequency).

In the case of the particular MMC VSC, the ripple frequency is directly determined by the effective switching frequency of the AC-DC converter 110 such that the frequencies are the same. In other examples, the switching frequency may determine the ripple frequency according to a different relationship (for example, it may be double or half of the ripple frequency).

The switching frequency of power electronic equipment of a network element may generally be at or below 10 kHz, leading to corresponding ripple frequencies at or below 10 kHz. Higher ripple frequencies may be possible, but could lead to further modes of stress or ageing in transmission lines. At or below a ripple frequency of 10 kHz, resistive heating in a transmission line would far exceed dielectric heating.

Table 1 below shows results for dielectric and resistive heating owing to ripple for a 320 kV XLPE (cross-linked polyethylene) cable. The calculations are based on a ripple current having a magnitude of I=100 A and a ripple voltage of magnitude of E=1000V. The heating results are determined based on the equations for dielectric and conductive power loss below, based on a tan(δ) of 0.01, set conservatively high to overestimate dielectric heating.

$P_d = E^2 \cdot C \cdot \omega \cdot \tan \delta$ $P_e = I^2 R$

TABLE 1

| Frequency | Dielectric Heating (W/km) | Conductor Heating (W/km) |
|---|---|---|
| DC | — | 12,000 |
| 1 kHz | 19 | 1,640 |
| 10 kHz | 194 | 3,146 |
| 100 kHz | 1,941 | 9,915 |

The ripple profile depends on other parameters, such as the reflectance properties at each connection or terminal of the transmission line 130. Reflectance properties may be determined by the apparent impedance of a network element coupled at the respective terminal. For example, the location of ripple magnitude local maxima and local minima along a transmission line may vary according to the apparent impedance at terminals of the transmission line.

Peaks (local maxima) in ripple magnitude correspond to hotspots of thermal and/or electrical stress, which may have an adverse effect on ageing of the cable.

As shown in FIG. 4, the ripple profile for network configurations having ripple frequencies of 300 Hz and 500 Hz have the most adverse (i.e. greatest) peak ripple magnitudes at approximately 2.5 pu. The ripple profile for network configurations having 1 kHz and 1.5 kHz ripple frequencies have relatively lower peaks (local maxima) of ripple magnitude at approximately 1 pu, with troughs (local minima) in the order of 0.2 pu. The ripple profiles for network configurations having 150 Hz and 200 Hz respectively have a gently increasing ripple profile with no local minimum—the ripple magnitude is at a minimum at the AC-DC converter 110.

Accordingly, operating the network 100 according to either one of the configurations may result in different hotspots of thermal and/or electric stress in the transmission line 130.

It may be desirable to operate the network 100 so that the ripple frequency is 150 Hz or 200 Hz such that thermal and/or electrical stress is relatively constant along the line. Alternatively, it may be desirable to operate the network 100 using conditions corresponding to a ripple frequency of 1 kHz or 1.5 kHz, particularly if the local minima of ripple magnitude may be aligned with any or all of the tunnel portion 134, tunnel portion 136 or exposed region 138 of the transmission line.

Figure 5:
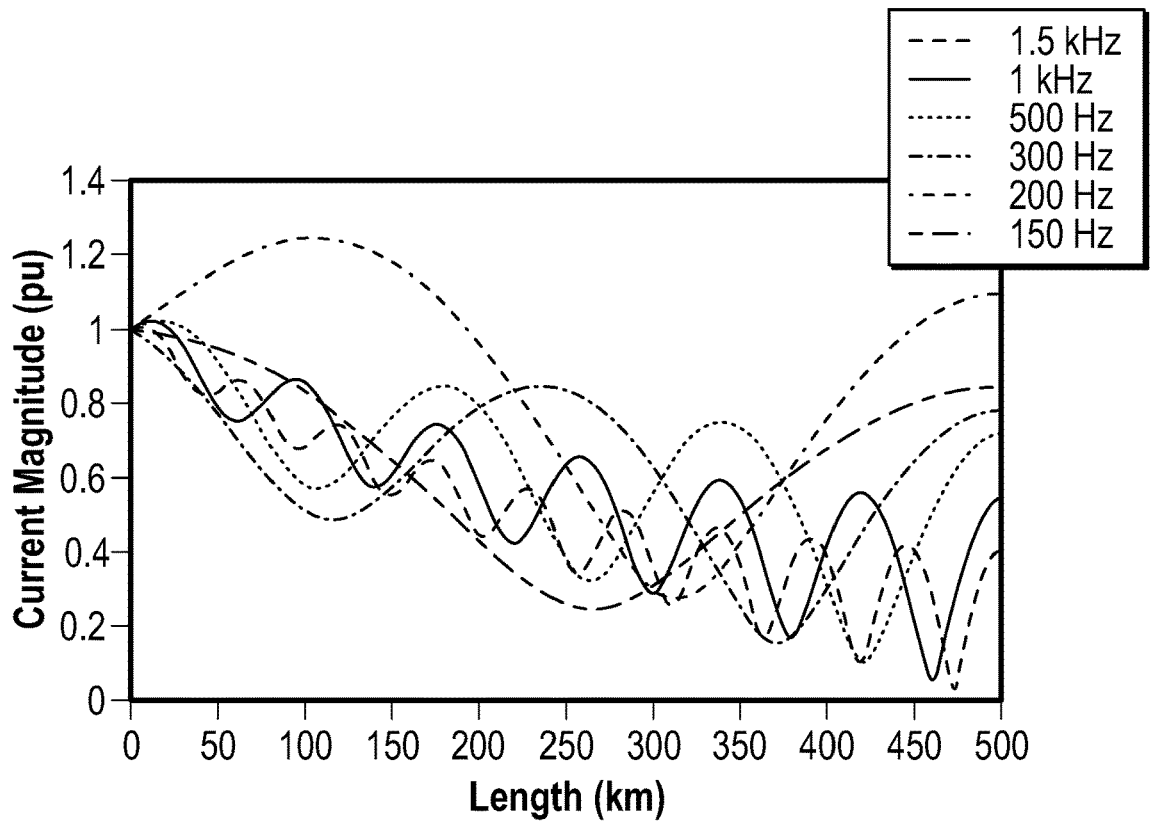
FIG. 5 shows ripple profiles in a 500 km power transmission line in different candidate configurations of the network.

FIG. 5 shows a further example set of simulated ripple profiles in a 500 km transmission line of the network 300 of FIG. 3. Generally, peak ripple magnitude is reduced in the 500 km line as compared with the 100 km line, with ripple attenuation along the line. This particular example corresponds to the second transmission line 332.

As shown in FIG. 5, at least some of the local maxima of any particular ripple profile are offset with respect to the closest local maxima of other ripple profiles.

Figure 6:
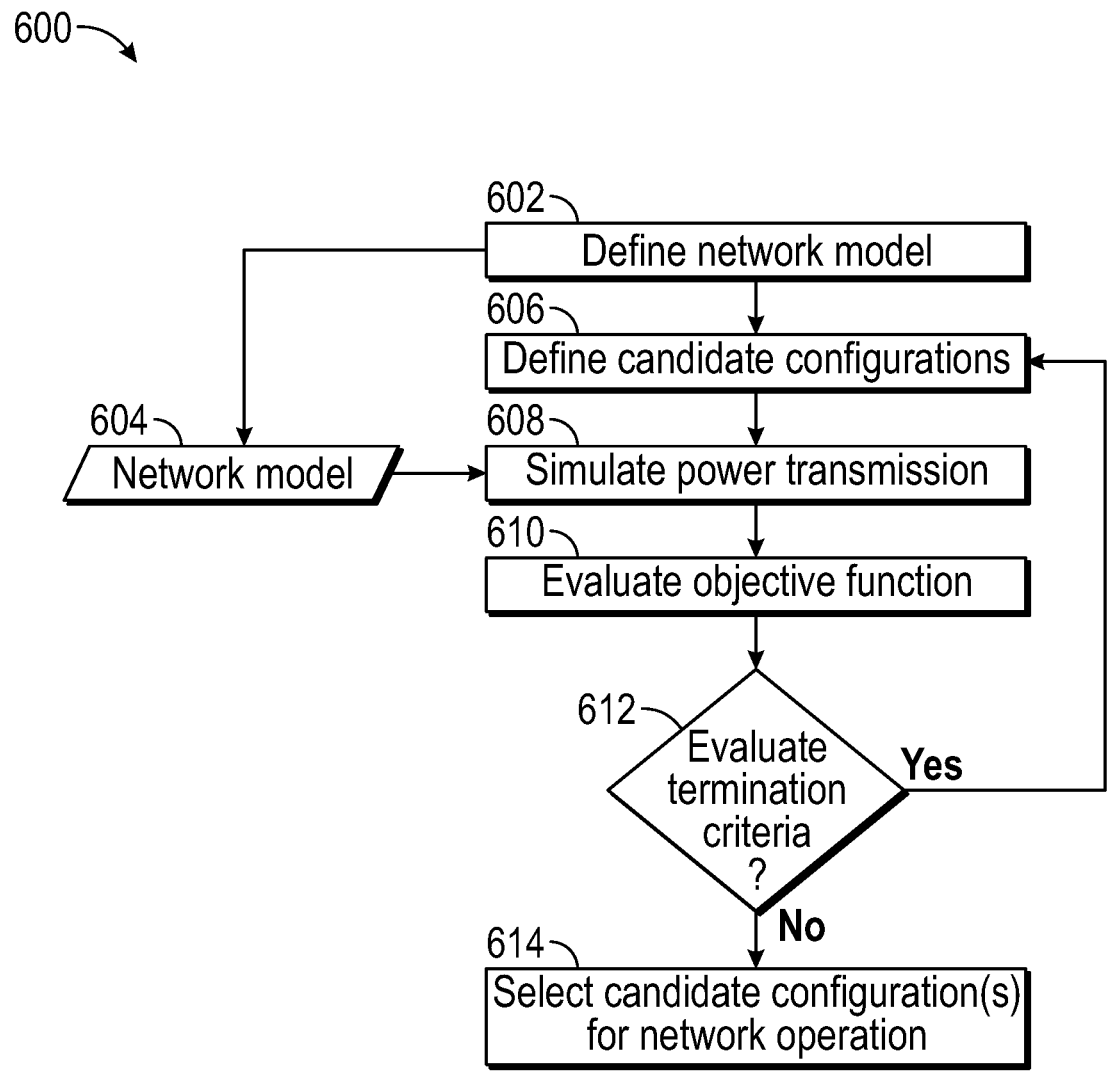
FIG. 6 shows a method of optimising control parameters for a power transmission network.

FIG. 6 shows an example method 600 of optimising control parameters for a network. The method will be described, by way of example only, with reference to the example network 100 described above with respect to FIG. 1 and the ripple profiles depicted in FIG. 3.

In block 602, a model 604 of the network is defined for simulation of power transmission. The network model 604 is defined by specifying the network elements and how they are connected. In this example, the AC-DC converter 110 and DC-AC converter 120 are defined, together with the transmission line 130 between them. For example, the type of converter (MMC VSC) and features of the power source 50 and AC grid 60 to which the respective converters 120, 130 are connected may be defined.

Further properties of the transmission line 130 may be defined, including the rated current and voltage. In this example, properties of the transmission line 130 along its length are defined based on it being an underground line, except for the intervening portions 134, 136, 138 corresponding to locations of a tunnel; a junction and an exposed portion of the line, as described above with respect to FIG. 2.

In block 606, a plurality of candidate configurations of the network 100 are defined. Each candidate configuration relates to a different permutation of variable control parameters for network elements 110, 120 of the network 100. In this particular example, the only control parameter that is varied is the switching frequency of the power electronic switch components of the AC-DC converter 110. In other examples, two or more control parameters for a particular network element may be varied between candidate configurations, and control parameters may vary for at least two of the network elements.

In this example, six candidate configurations are defined in which the switching frequency control parameter is 150 Hz, 200 Hz, 300 Hz, 500 Hz, 1 kHz and 1.5 kHz, as shown in FIG. 4. In the particular network 100, the switching frequency determines the ripple frequency in the power transmission line such that the ripple frequency is equal to the switching frequency.

In block 608, power transmission in the network 100 is simulated based on the network model 604 for each of the candidate configurations. For each candidate configuration, power transmission is simulated to determine ripple data relating to a ripple profile (i.e. current ripple and/or voltage ripple) along the power transmission line, based on the definition of the network elements and their relationship, and the control parameters such as switching frequency and the apparent impedance of network elements. In this example, the simulated ripple profiles are as shown in FIG. 4.

It will be appreciated that ripple data relating to the ripple profile may take several different forms. For example, ripple data may define a full profile of ripple magnitude along the transmission line; or may define the locations of local maxima and minima of ripple magnitude (current ripple and/or voltage ripple), optionally including the ripple magnitude at each location.

In block 610, one or more objective functions relating to the optimisation of the network is evaluated. The objective function is a function of the ripple data which can be evaluated to determine how well the ripple profile for a particular candidate configuration corresponds to desired conditions, and enable a comparison with evaluations for other candidate configurations.

For example, a simple objective function may be set based on minimising the maximum ripple magnitude along the line, which may limit local thermal and/or electrical stress at any point along the transmission line. As shown in FIG. 4, such an objective function would favour the candidate configuration corresponding to a ripple frequency (and switching frequency) of 1.5 kHz. It will be appreciated that objective functions may be defined to target other desired conditions in the line. For example, an objective function may be set to favour ripple profiles with a low variance of ripple magnitude, to avoid isolated hotspots. An objective function may be set based on the number of local maxima to limit the number of hotspots.

In this particular example, multiple objective functions are defined and analysed corresponding to minimising ripple magnitude at each of the tunnel portion 134, junction portion 136 and exposed portion 138 of the transmission line. These portions shall be referred to as target portions in the following description since the optimisation may be targeted to mitigate thermal and/or electric stress due to ripple in these portions of the line specifically.

In particular, a first objective function may be defined to favour the lowest average ripple magnitude over the three target portions. Three further objective functions may be defined to favour the lowest ripple magnitude at each individual target location respectively.

Each of the objective functions may be defined so that they are adversely affected by a large peak magnitude elsewhere, for example at the other target portions or anywhere along the transmission line. For example, the first objective function may be defined so that a ripple profile having low ripple magnitude at each of the target portions may nevertheless correspond to a poor evaluation of the objective function if a peak ripple magnitude away from the target portions is relatively high.

In block 612, termination criteria for the optimisation are determined. In this example, the termination criteria are set so that the optimisation may be terminated provided that at least one of the objective functions is within a pre-determined range corresponding to acceptable performance of the network. If the termination criteria is not met, the method reverts in a loop to block 606 in which further candidate configurations are defined by further variation of the control parameters. In other examples, termination criteria may be set to result in continued iterative development of the candidate configurations towards respective optimal configurations for the or each objective function, for example by tracking a trend in outcomes of the objective function to determine if further improvement can be expected or if a plateau has been reached.

In block 614, one or more candidate configurations for operation of the network 100 is selected based on the objective functions. In some examples, a single candidate configuration may be selected, for example if the ripple profile for the candidate configuration corresponds to a relatively low peak ripple magnitude and avoids severe ripple effects at each of any target portions.

In this particular example, it is determined that the most optimal candidate solution for the first objective function (i.e. defined based on the average ripple magnitude across the target portions of the transmission line) still results in a hotspot of thermal and/or electric stress at one of the target portions. Accordingly, it is determined to select two or more candidate configurations and change between them during operation of the network periodically. It will be appreciated that suitable optimisation procedures can be defined to make such an assessment based on analysis of a ripple profile and comparison between evaluations of respective objective functions.

In this particular example, a first candidate configuration corresponding to a switching frequency of 1 kHz is selected as it corresponds to optimal evaluations of the objective functions for the tunnel portion 134 and junction portion 136 of the transmission line. A second candidate configuration corresponding to a switching frequency of 1.5 kHz results in poorer evaluations of the objective functions for the tunnel portion 134 and junction portion 136, but an optimal evaluation of the objective function for the exposed portion 138.

A control procedure for the network is determined so that the network is operated in the first and second configurations alternately for successive periods, for example in alternating periods of 2 hours respectively. Two or more of the candidate configurations may be selected to limit the thermal and/or electric stress at corresponding hotspot locations over time, for example, to result in a more uniform profile of heating along the transmission line than would result from continuous operation according to a single configuration.

It will be appreciated that, in other examples, further control parameters may be varied in the optimisation method, for example, both a switching frequency and apparent impedance of any power electronic network element within the network Whilst an example optimisation method has been defined in which a plurality of candidate configurations are defined and a simulation is conducted for each, it will be appreciated that the plurality of candidate configurations need not be defined before simulation begins. In some examples, candidate configurations may be defined based on the outcome of simulations for other candidate configurations, for example in an iterative approach. In other examples, a set of candidate configurations may be defined in advance, and each of the candidate configurations simulated before analysing ripple data relating to the simulations to select one or more configurations for operation of the network.

Figure 7:
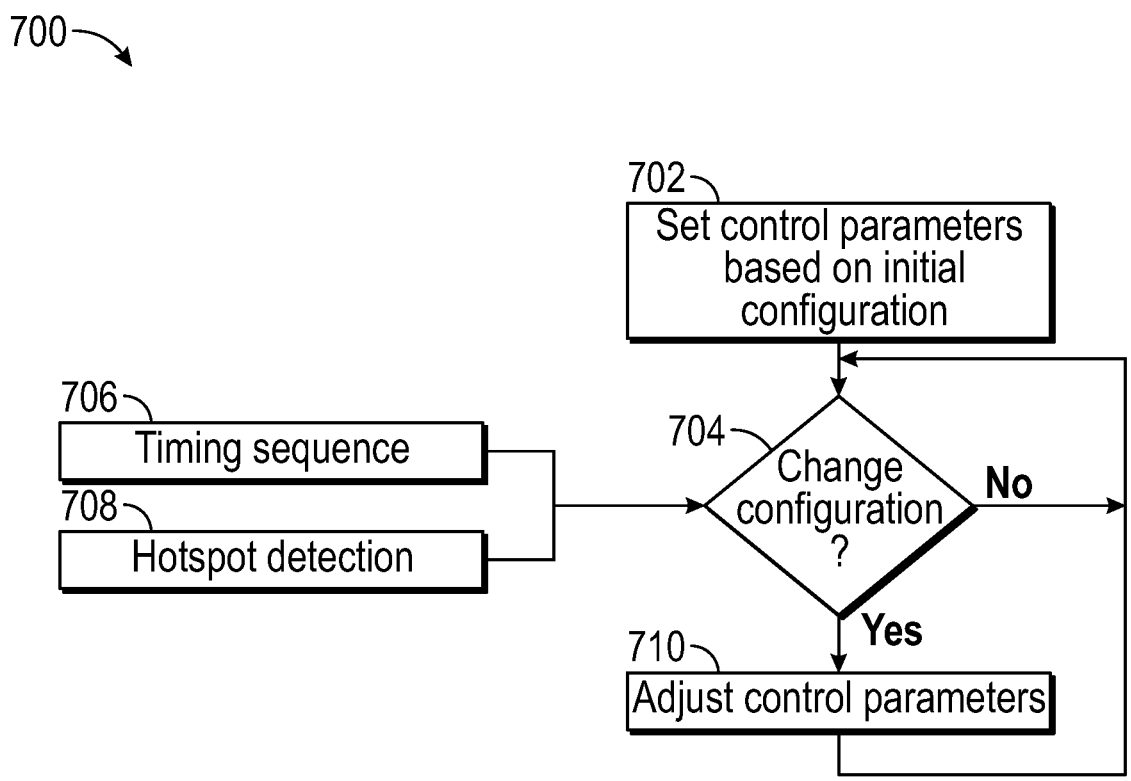
FIG. 7 shows a method of controlling a network element.

FIG. 7 shows a method of operating a network element of a network, as will be described by way of example only with respect to the AC-DC converters 110, 120 of the network 100 of FIG. 1. However, the method is equally applicable to the multi-terminal network 300 of FIG. 3

The converter 110 is controlled to operate by the controller 112, which is coupled to a global control network to receive control instructions as will be described below (for example, from a station control for the power transmission network 100).

In this example, the controller 112 is configured to operate the converter 112 according to a pre-determined control procedure, which may be determined as the result of the optimisation method 600 described above with respect to FIG. 6. In this example, current is transmitted from the converter 120 to the converter 110. The particular control procedure in this example is to change between a first configuration in which the switching frequency of the converter 110 is 1000 Hz and the apparent impedance of the converter 112 is low (1 Ohm); and a second configuration in which the switching frequency remains 1000 Hz and the apparent impedance of the converter 110 is high (100 Ohm), the converter 110 being operated in each configuration for an example period of 2 hours in turn. In other examples, operation in each configuration may be for a shorter or longer period, which may depend on a level of thermal and electrical stress which may occur during operation in the respective configuration, as described above.

Figure 8:
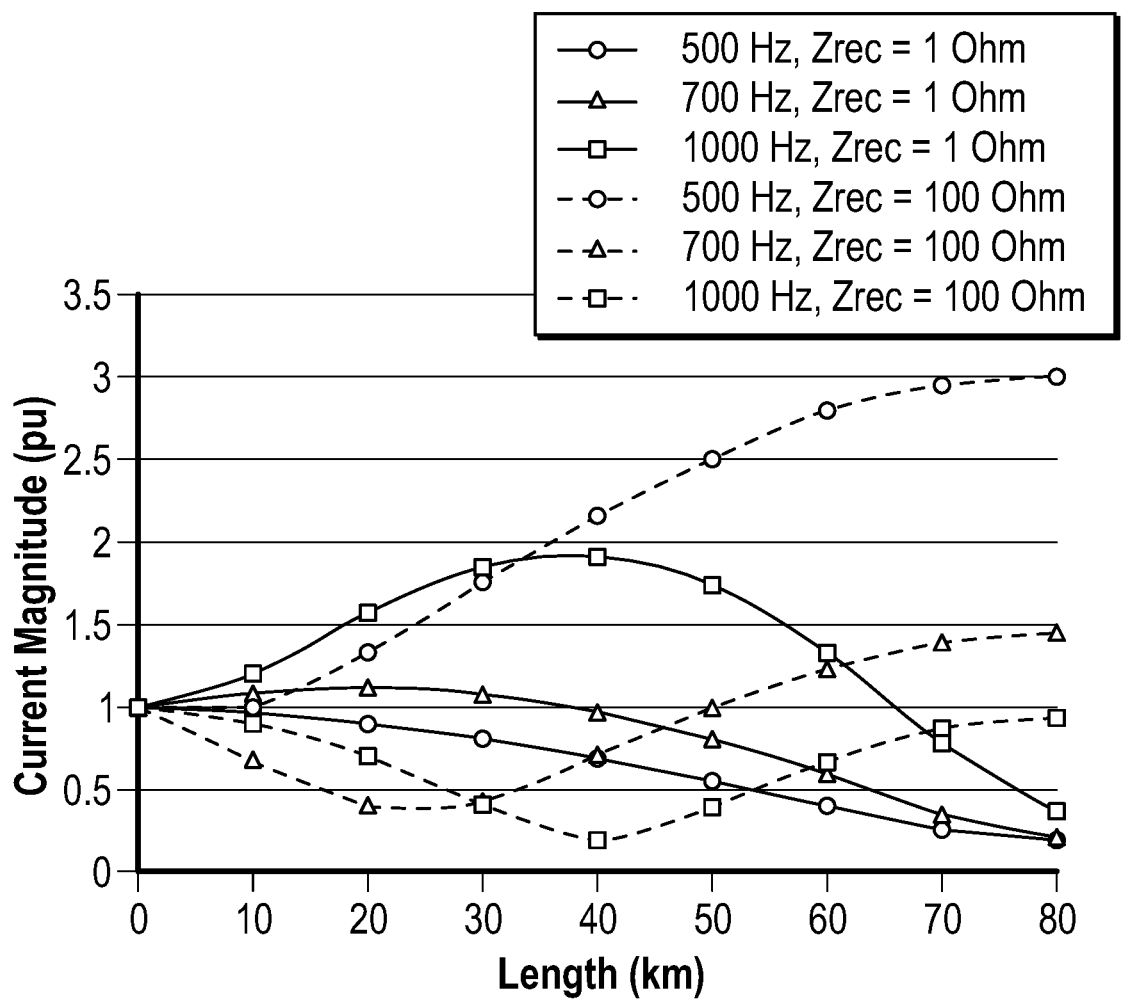
FIG. 8 shows a plot of ripple profiles in a transmission line with varying apparent impedance.

As shown in FIG. 8, the ripple profile varies owing to the change in apparent impedance at the converter 120. In this particular example, there is a local minimum current ripple magnitude at a location of approximately 40 km along the line in the first configuration, and in the second configuration there is a local maximum current ripple magnitude at approximately the same location.

In other examples, different control parameters may be adjusted between configurations, such as the switching frequency. In further examples, two or more control parameters may be adjusted between configurations.

Referring back to FIG. 7, in block 702, the control parameters for the converter 315 are set in the initial configuration for operation of the network 300, which in this example is the first configuration.

In block 704, the controller repeatedly checks whether to change configuration. In this example, the controller 704 refers to a predetermined timing sequence (or schedule) for changing the configurations 706, and also checks for receipt of a hotspot detection signal (block 708) relating to detection of a hotspot along the respective transmission line 332.

As described above with respect to the network 300 of FIG. 3, the network 300 is provided with a temperature sensing apparatus 350 along the transmission line 332 for detecting hotspots along the line. The hotspot detection unit within a controller 352 of the temperature sensing apparatus evaluates a thermal profile along the transmission line 332 to detect hotspots.

In this particular example, hotspots are predicted to occur along the transmission line according to the control procedure, and are mitigated by changing the configuration of the converter 315 periodically. Accordingly, in this example the hotspot detection unit (or the controller 316) is configured to generate a hotspot detection signal when the thermal profile along the transmission line indicates hotspot heating in excess of that predicted to occur. The hotspot detection signal may be received at the controller 316 via the global control network C, to which both the controller 316 for the converter 315 and the controller 352 of the temperature sensing apparatus are connected.

If a change in configuration is not due according to the timing sequence 706, and no hotspot detection signal is received, the method 700 continues in a loop to repeatedly conduct the checks of block 704. When either a hotspot detect signal 708 is received or a change in configuration is due according to the timing sequence 706, the method 700 proceeds to change between the selected configurations (block 710) to adjust the control parameters for operation of the converter 315.

When a change is initiated in response to a hotspot detection signal, a configuration for continued operation of the network may be selected to mitigate thermal and/or electric stress due to ripple at the respective hotspot location.

Figure 9:
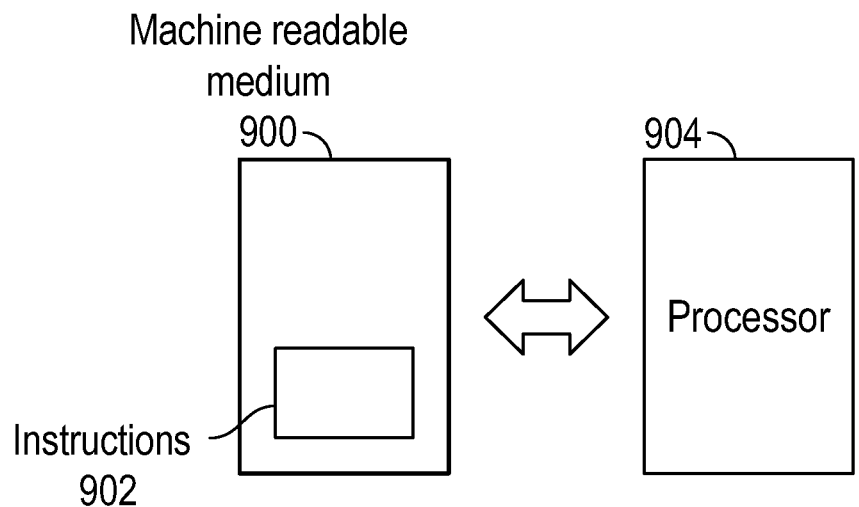
FIG. 9 schematically shows a machine readable medium encoded with instructions and a processor.

FIG. 9 shows a machine readable medium 900 having a memory encoded with instructions 902 which, when executed by a processor 904, execute a method as described above.

In one example, the machine readable medium 900 is encoded with instructions to execute a method of optimising control parameters for a power transmission network, as described above with respect to FIG. 6. For example, the instructions may be executed by a computer comprising a processor as part of a design or commissioning stage for a power transmission network. The instructions may be encoded as software, for example, stored on or accessible by such a computer. The machine readable medium may, for example, be a memory of a computer, such as a hard disk, or a removable medium such as a compact disk or flash drive.

In a further example, the machine readable medium 900 is encoded with instructions to execute a method of controlling a network element for a power transmission network as described above with respect to FIG. 7. For example, the machine readable medium 900 may be a memory of a controller for a network element, the controller additionally comprising a processor for executing the instructions encoded thereon.

Although an example of the invention has been described with respect to HVDC networks, it will be appreciated that the invention is equally applicable to other power transmission networks having a transmission line and a power electronic network element to control ripple in the network. For example, the invention could be applied to AC distribution grids configured to receive power from wind turbines. Such wind turbines may generate AC power which is converted to DC and back to AC for injection into a wider AC distribution grid. Power electronic components in the AC-DC and/or DC-AC conversion steps may introduce ripple effects.

The invention claimed is:

1. A controller for a power electronic network element of a power transmission network, wherein the controller is configured to vary a control parameter of the network element which at least partly determines a ripple profile in a transmission line of the network, wherein the controller is configured to vary the control parameter between at least a first value and second value to cause the ripple profile in the transmission line to change, wherein the ripple profile has one or more hotspot locations of maximum ripple magnitude corresponding to a hotspot of thermal or electric stress, wherein at least some of the hotspot locations differ between a respective ripple profile corresponding to each of the at least first and second values, and wherein the controller is configured to vary the control parameter periodically between the at least first and second values to mitigate hotspots of thermal and electric stress at respective local maxima of ripple magnitude.

2. The controller according to claim 1, wherein the control parameter is selected from the group comprising:
   a switching frequency of the power electronic network element; and
   an apparent impedance parameter which determines the apparent impedance of the network element.

3. A power transmission network comprising a power transmission line, a power electronic network element for controlling power transmission through the power transmission line, and a controller for varying a control parameter of the network element, the controller configured to vary a control parameter of the network element which at least partly determines a ripple profile in a transmission line of the network, wherein the controller is configured to vary the control parameter between at least a first value and second value to cause the ripple profile in the transmission line to change, wherein the ripple profile has one or more hotspot locations of maximum ripple magnitude corresponding to a hotspot of thermal or electric stress, wherein at least some of the hotspot locations differ between a respective ripple profile corresponding to each of the at least first and second values, and wherein the controller is configured to vary the control parameter periodically between the at least first and second values to mitigate hotspots of thermal and electric stress at respective local maxima of ripple magnitude.

4. The power transmission network according to claim 3, further comprising:
   a temperature sensing apparatus configured to monitor a temperature profile along the transmission line,
   a hotspot detection unit configured to determine when a local temperature maximum along the transmission line reaches a threshold based on an output of the temperature sensing apparatus; and
   wherein the controller is configured to vary the control parameter of the network element based on the threshold amount of local heating being determined.

5. The power transmission network according to claim 4, wherein there are a plurality of power electronic network elements interconnected by a plurality of transmission lines, and wherein the controller is configured to vary control parameters of at least two of the network elements to change between respective configurations of the network.

6. A computer-implemented method of optimising control parameters for a power transmission network comprising a transmission line and a power electronic network element for controlling power transmission through the transmission line, the method comprising:
   defining a plurality of candidate configurations of the network, each candidate configuration defined by one or more variable control parameters for the network element, each control parameter at least partly determining a ripple profile in the transmission line;
   for each candidate solution, simulating power transmission in the network to determine ripple data relating to a simulated ripple profile in the network;
   selecting one of the candidate configurations of the network based on an objective function relating to thermal and/or electric stress due to ripple in the transmission line; and
   defining a transient control procedure for the network including sequentially and repeatedly changing between each of a plurality of selected candidate configurations to mitigate hotspots of thermal or electric stress at respective local maxima of ripple magnitude.

7. The method according to claim 6, wherein the control parameters of at least two candidate configurations are defined so that the respective simulated ripple profiles have different ripple frequencies.

8. The method according to claim 6, wherein the control parameters defining the candidate configurations include a switching frequency of the network element, and wherein the switching frequency is varied between at least two of the candidate configurations so that the respective simulated ripple profiles have different frequencies.

9. The method according to claim 6, wherein the control parameters defining the candidate configurations include an apparent impedance parameter relating to the apparent impedance at a terminal of the network, and wherein the apparent impedance parameter is varied between at least two of the candidate configurations so that the respective simulated ripple profiles differ from one another.

10. The method according to claim 6, wherein the selected candidate configuration is selected at least partly based on an objective function relating to thermal and/or electric stress due to ripple in a target portion of the transmission line.

11. The method according to claim 10, wherein the selected candidate configuration is selected at least partly based on an objective function relating to the proximity of the target portion along the transmission line to a local maximum and/or minimum of ripple magnitude in a respective ripple profile.

12. The method according to claim 11, wherein the or each target sub-portion corresponds to one of:
   a junction between two portions of the transmission line;
   a tunnel portion of the transmission line;
   a region of adverse ground conditions for the transmission line; and an exposed portion of the transmission line in which the transmission line is exposed to atmospheric conditions.

13. The method according to claim 6, wherein an objective function relates to a global metric of thermal or electric stress due to ripple in the transmission line.

14. The method according to claim 6, further comprising defining a transient control procedure for the network including sequentially and repeatedly changing between each of a plurality of selected candidate configurations to mitigate hotspots of thermal or electric stress at respective local maxima of ripple magnitude.

* * * * *